Jan. 22, 1963  R. D. KOONTZ  3,074,585
PRESSURE VESSEL
Filed Nov. 20, 1959  3 Sheets-Sheet 1

INVENTOR.
ROBERT D. KOONTZ
BY
Carpenter Abbott Coulter & Kinney
ATTORNEYS

Jan. 22, 1963 R. D. KOONTZ 3,074,585
PRESSURE VESSEL
Filed Nov. 20, 1959 3 Sheets-Sheet 2

INVENTOR.
ROBERT D. KOONTZ
BY
*Carpenter Abbott Coulter & Kinney*
ATTORNEYS

Jan. 22, 1963  R. D. KOONTZ  3,074,585
PRESSURE VESSEL

Filed Nov. 20, 1959  3 Sheets-Sheet 3

INVENTOR.
ROBERT D. KOONTZ
BY
Carpenter Abbott Coulter & Kinney
ATTORNEYS

United States Patent Office 3,074,585
Patented Jan. 22, 1963

3,074,585
PRESSURE VESSEL
Robert D. Koontz, Manhattan Beach, Calif., assignor, by mesne assignments, to Minnesota Mining and Manufacturing Company, St. Paul, Minn., a corporation of Delaware
Filed Nov. 20, 1959, Ser. No. 854,482
10 Claims. (Cl. 220—3)

This invention relates to improvements in pressure vessels and to the method of making such vessels.

In the development of pressure vessels, particularly for military applications, reinforced plastic has found rather wide acceptance as those skilled in the art have sought to produce low cost vessels having a high strength-to-weight ratio. In the fabrication of cylindrical pressure vessels having one or both ends closed by a generally hemispherical end wall, one known method is to fabricate a tubular cylindrical main body section and cup-shaped hemispherical end caps separately. The end cap or caps are then attached to the tubular section, as by cooperating screw threads formed thereon and/or by one or more layers of resin bonded filaments. The area of joinder of the tubular section with the end caps is inherently a weaker area, and in order to insure adequate strength thereat, a plurality of reinforcing layers of resin bonded filaments has ordinarily been applied. This reinforcement adds substantially to the weight of the structure and where weight is an important factor, for example in propellant cases for rocket motors, such additional weight is highly undesirable.

It is a general object of the present invention to provide an improved pressure vessel of novel construction formed of resin bonded filaments and having a high strength-to-weight ratio.

Another object of the invention is to provide an improved method of forming a pressure vessel of the character aforementioned.

A further object of the invention is to provide an improved pressure vessel of the class described, the fabrication of which is well adapted for accomplishment by mass production techniques.

Other and further objects of the invention will become apparent as the description proceeds, reference being had to the drawings accompanying and forming a part of this specification wherein.

Figure 1:
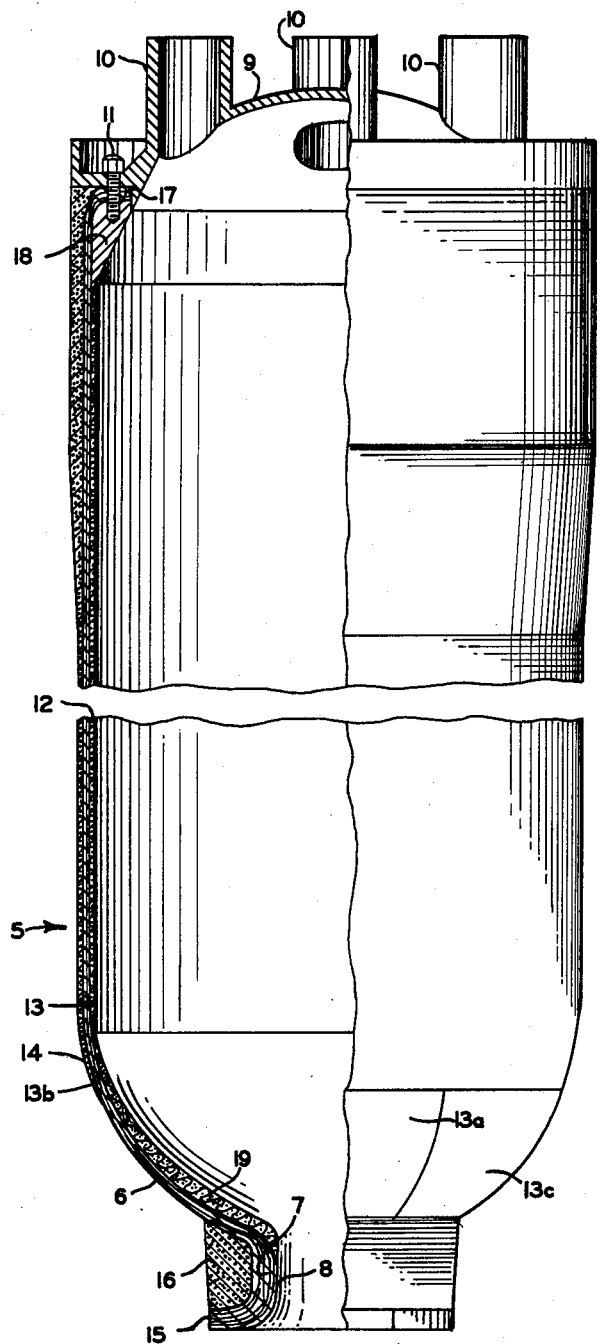
FIGURE 1 is a fragmentary side elevational view of one form of the improved pressure vessel, parts being broken away and shown in section.
Figure 3:
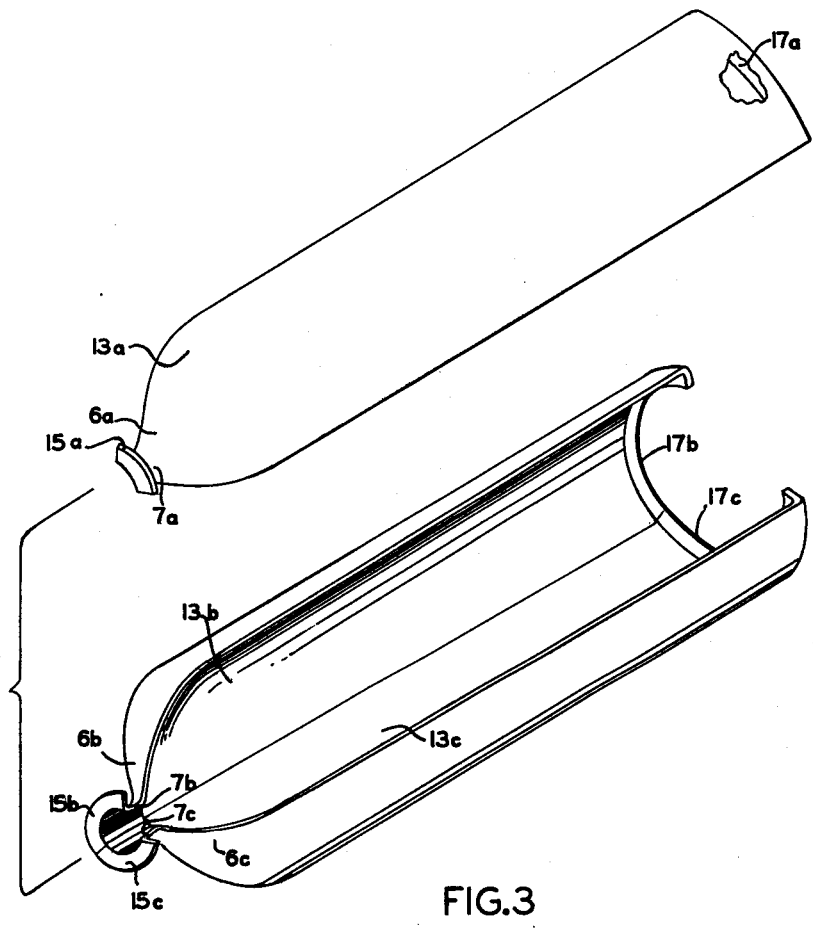
FIGURE 3 is an exploded perspective view showing the segmental stave-like strips embodied in the improved pressure vessel.

Referring more particularly to FIGURES 1 and 3 of the drawing, the pressure vessel illustrated therein takes the form of a tubular cylindrical rocket motor propellant case 5 of reinforced plastic having a generally hemispherical end wall 6 closing one end of said case and provided with an axial boss 7 formed with a coaxial bore 8. The opposite end of the case 5 is open and is adapted for connection thereto of suitable closure means, for example the cover plate 9 formed with exhaust tubes 10 and secured to the case 5 as by screws 11.

The case 5 comprises an inner tubular shell 12 of circumferentially oriented resin bonded filaments, an intermediate shell 13 of longitudinally oriented resin bonded filaments, and an outer tubular shell 14 of circumferentially oriented resin bonded filaments. The end wall 6 is formed by extension of the intermediate shell 13 which becomes thicker in cross section as it approaches the tubular boss 7, the latter terminating in a radially outwardly directed annular flange 15 of reducing cross section. Surrounding the boss 7 between the flange 15 and end wall 6 is a collar 16 of circumferentially oriented resin bonded filaments. The inner surface of the end wall 6 may be overlaid with a generally hemispherical pressure distributing liner 19, for example of nylon fabric impregnated with a flexible epoxy resin. At the opposite end of the case 5 the intermediate shell 13 is formed with an inturned annular flange 17, and internally abutting said flange is a molded ring 18 of resin bonded filaments. The cover plate 9, flange 17 and ring 18 are suitably apertured to accommodate the screws 11 which have threaded engagement with the ring 18 as shown.

As shown in FIGURE 3, the intermediate shell 13 is comprised of a plurality of similar stave-like segmental strips 13a, 13b and 13c. While three such stave-like strips are utilized to form the shell 13 in FIGURES 1 to 3, said shell may be made up of any suitable or desired number of similar segmental strips. The strips 13a, 13b and 13c are respectively formed at one end with curved transversely, i.e. radially inwardly, directed segmental extents 6a, 6b and 6c of reducing width and increasing thickness which merge respectively into axially directed segmental extents 7a, 7b and 7c of curved cross section, the latter terminating in radially outwardly directed segmental extents 15a, 15b and 15c of reducing thickness. At their other ends, the strips 13a, 13b and 13c are formed with radially inwardly directed segmental extents 17a, 17b and 17c.

Each of the segmental strips 13a, 13b and 13c is preferably formed of filaments which extend continuously therethrough from the outer end of the flanges 15a, 15b and 15c to the inner end of the flanges 17a, 17b and 17c. The filaments extend longitudinally and parallel to one another, and the main body section of each strip is preferably of substantially uniform thickness. In the region of the extents 6a, 6b and 6c, the filaments converge as said extents reduce in width, and such convergence results in increasing thickness. The axially directed extents 7a, 7b and 7c have portions of uniform and substantial thickness, whereas the extents 15a, 15b and 15c, due to the divergence of the filaments therein as the width thereof increases, are of decreasing thickness. The segmental strips 13a, 13b and 13c are preferably premolded and may comprise filaments of glass or other suitable material impregnated with a suitable hardened resin, for example an amine cured epoxy resin.

Figure 2:
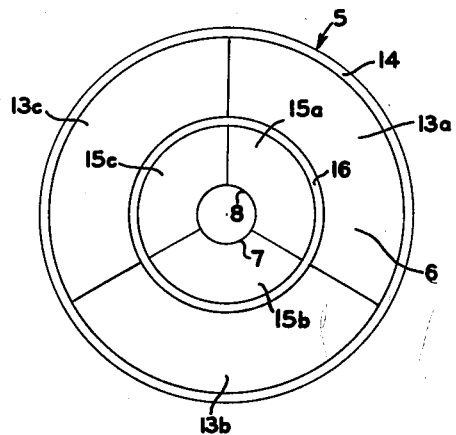
FIGURE 2 is an end view of the improved pressure vessel as viewed from the left in FIGURE 1.

The fabrication of the improved pressure vessel illustrated in FIGURES 1 and 2 will now be described. The inner shell 12 is formed on a suitable mandrel (not shown) by circumferentially winding thereon under substantial tension filaments preferably in the form of fiber glass roving or tape impregnated with an uncured resin in a liquid state or a resin cured to the "B" stage. The specific resin used may be the same as that used in the shell 13. Upon completion of the winding, the impregnating resin is suitably cured, for example by subjection to heat, to form the rigid shell 12. The outer surface of the shell 12 is then machined to provide a smooth external surface for engagement by the shell 13. The machined shell 12 is then transferred to an expansible assembly mandrel (also not shown), and also assembled onto the assembly mandrel at opposite ends of the shell 12 are the generally hemispherical liner 19 and the molded ring or insert 18. A suitable low temperature curing resin, for example, a low temperature amide curing epoxy is then applied in a liquid state to the outer surfaces of the liner 19, shell 12 and ring 18, as well as to the longitudinal edge surfaces of the preformed stave-like segmental strips 13a, 13b and 13c, and said strips are then assembled in snug fitting relation to said liner, shell and ring and in edge to edge engagement with each other before the applied resin has had time to cure. The applied resin is self-curing and retains the strips 13a, 13b and 13c in intimate contact with each other and with the liner 19, shell 12 and ring 18.

The collar 16 is then formed by circumferentially winding fiber glass or other suitable filaments impregnated with uncured resin of the type used in the shells 12 and 13, said winding filling the space between the flange 15 and end wall 6 as shown in FIGURE 1. The shell 14 is then formed by winding fiber glass or other suitable filaments impregnated with uncured resin of the type used in shells 12 and 13, and said filaments may be wound in a manner to provide the shell 14 with increased thickness adjacent the open end thereof as shown in FIGURE 1. If desired, the circumferential winding forming the shell 14 may be continued over the surface of the end wall 6 to merge with the collar 16. Similarly, the winding constituting the shell 12 may be formed in a manner to continue over the inner surface of the end wall 6, in which case the liner 19 may be dispensed with. The uncured resin in the windings constituting the shell 14 and collar 16 is then subjected to a suitable curing operation, for example by exposure to heat, to form an integral pressure vessel. The external surface of the casing 5 is then machined as necessary, and said casing is then removed from the assembly mandrel. The case is now ready for charging and attachment thereto of the cover plate 9 in preparation for use.

Figure 4:
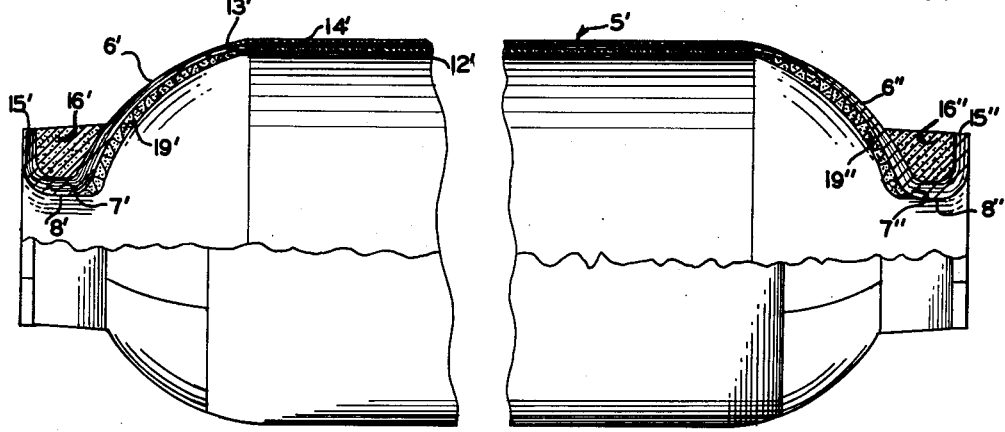
FIGURE 4 is a view similar to FIGURE 1 showing another form of the improved pressure vessel.

FIGURE 4 illustrates another form of the invention, more specifically a pressure vessel 5' in which both ends thereof are provided with generally hemispherical end walls, i.e. end walls 6' and 6" having bosses 7' and 7" formed thereon. As will be apparent, the elements indicated by primed and double primed reference numerals in FIGURE 4 correspond to similar parts indicated by the same numerals unprimed in FIGURES 1 and 2. In the vessel 5' the segmental longitudinal strips forming the shell 13' and corresponding to the strips 13a, 13b and 13c of FIGURE 3 have substantially identically formed opposite end portions which may be substantially identical with the extents 6a, 7a and 15a of the strip 13a in FIGURE 3.

The winding and assembly steps in the fabrication of the vessel 5' are similar to those for the vessel 5 and may be carried out on a mold or mandrel of a high melting point wax or a low melting point metal alloy. Curing of the resin in shells 12' and 14' and in collars 16' and 16" is carried out at a temperature below the melting point of the mold or mandrel, and upon completion of the final machining operation, the temperature of the assembly is raised above the melting point of the mandrel material, and said material is withdrawn through one of the bosses 7' or 7".

In the form of the invention shown in FIGURE 4, the circumferential winding comprising the shell 12' is carried over the inner surface of the end walls 6' and 6" as shown at 19' and 19". Where the vessel 5' is to be used for the accommodation of liquids, or materials which might react chemically with the shell 12', it may be desirable to provide a thin-walled relatively inert fluid impermeable liner (not shown) overlaying the inner surface of the shell 12' and its end walls 19' and 19" to prevent contact of the contained contents with the materials of said shell and its end walls. While the invention has been shown and described as having embodied therein a single shell 13 or 13' formed of the segmental stave-like strips of longitudinal filament means, it is within the inventive concept to provide a pressure vessel having more than one such shell concentrically arranged and having a shell of circumferentially oriented filament means interposed between adjacent shells of longitudinal filaments.

Various other changes and modifications may be made to meet the requirements of practice without in any way departing from the spirit of the invention, and all of such changes are contemplated as may come within the scope of the appended claims.

What is claimed as the invention is:

1. A reinforced plastic tubular body comprising a plurality of stave-like segmental strips disposed in edge to edge abutment to form a tubular shell, said strips at one end of said shell each being formed with a tapered radially inwardly directed segmental extent of reducing width and increasing thickness to form an end wall for said shell, said strips being formed substantially entirely of continuous resin bonded filaments extending longitudinally from one end thereof to the other, and means for retaining said strips in assembled relation comprising means sealingly bonding the mating edges of said strips to each other throughout the length of said strips, and circumferentially wound filament means overlaying a surface of said shell.

2. A reinforced plastic tubular body comprising a plurality of stave-like segmental strips disposed in edge to edge abutment to form a tubular shell, said strips at one end of said shell each being formed with a tapered radially inwardly directed segmental extent of reducing width and increasing thickness to form an end wall for said shell, said tapered extents each merging into an axially directed segmental extent to form an axial boss, said strips each being formed substantially entirely of continuous resin bonded filaments extending longitudinally from one end thereof to the other, and means for retaining said strips in assembled relation comprising circumferentially wound filament means overlaying a surface of said shell and of said boss.

3. A reinforced plastic tubular body comprising a plurality of similar stave-like segmental strips disposed in edge to edge abutment to form a tubular shell, said strips at one end of said shell each being formed with an arcuate tapered radially inwardly directed segmental extent of reducing width and increasing thickness to form a convex generally hemispherical end wall for said shell, said tapered extents each merging into an axially directed segmental extent to form an axial boss, said strips each being formed substantially entirely of continuous resin bonded filaments extending longitudinally from one end thereof to the other, and means for retaining said strips in assembled relation comprising means sealingly bonding the mating edges of said strips to each other throughout the length of said strips, and circumferentially wound filament means overlaying a surface of said shell and of said boss.

4. A reinforced plastic tubular body comprising a plurality of stave-like segmental strips disposed in edge to edge abutment to form a tubular shell, said strips at one end of said shell each being formed with a tapered radially inwardly directed segmental extent of reducing width and increasing thickness to form an end wall for said shell, said tapered extents each merging into an axially directed segmental extent terminating in a radially outwardly directed segmental extent to form an axial boss formed with a terminal annular flange, said strips being formed substantially entirely of continuous resin bonded filaments extending longitudinally from one end thereof to the other, and means for retaining said strips in assembled relation comprising circumferentially wound filament means overlaying a surface of said shell and the outer surface of said boss between said end wall and said annular flange.

5. A reinforced plastic tubular body comprising a plurality of stave-like segmental strips disposed in edge to edge abutment to form a tubular shell, said strips at one end of said shell each being formed with a tapered radially inwardly directed segmental extent of reducing width and increasing thickness to form an end wall for said shell, said strips being formed substantially entirely of continuous resin bonded filaments extending longitudinally from one end thereof to the other, and means for retaining said strips in assembled relation comprising means sealingly bonding the mating edges of said strips to each other throughout the length of said strips, a layer of circumferentially wound filament means overlaying and bonded to the outer surface of said shell, and a layer of circumferentially wound filament means overlaying and bonded to the inner surface of said shell.

6. A reinforced plastic tubular body comprising a plurality of stave-like segmental strips disposed in edge to edge abutment to form a tubular shell, said strips at one end of said shell each being formed with a tapered radially inwardly directed segmental extent of reducing width and increasing thickness to form an end wall for said shell, said tapered extents each merging into an axially directed segmental extent terminating in a radially outwardly directed segmental extent to form an axial boss formed with a terminal annular flange, said strips being formed substantially entirely of continuous resin bonded filaments extending longitudinally from one end thereof to the other, and means for retaining said strips in assembled relation comprising means for sealingly bonding the mating edges of said strips to each other throughout the length of said strips, circumferentially wound filament means overlaying and bonded to the inner surface of said shell, and circumferentially wound filament means overlaying and bonded to the outer surface of said shell and to the outer surface of said boss between said flange and said end wall.

7. A reinforced plastic tubular body comprising a first cylindrical tubular shell formed of circumferentially wound continuous resin bonded filament means, a second shell formed of a plurality of stave-like segmental strips formed substantially entirely of continuous resin bonded filaments extending longitudinally from one end thereof to the other, said strips each being bonded to the outer surface of said first shell and being bonded to each other in edge-to-edge relation throughout their length to form a cylindrical tubular main body portion, said strips being formed with tapered arcuate extents of reducing width and increasing thickness forming a generally hemispherical end wall, a generally hemispherical pressure distributing liner covering the inner surface of said generally hemispherical end wall, and a third shell formed of resin bonded circumferentially wound continuous filament means overlaying and bonded to at least the main body portion of said second shell.

8. A reinforced plastic tubular body comprising a plurality of stave-like segmental strips disposed in edge-to-edge abutment to form a tubular shell, said strips being formed substantially entirely of continuous resin bonded filaments extending longitudinally from one end thereof to the other, and means for retaining said strips in assembled relation, comprising means for sealingly bonding the mating edges of said strips to each other throughout the length of said strips, circumferentially wound resin bonded filament means overlaying and bonded to the inner surface of said shell, and circumferentially wound resin bonded filament means overlaying and bonded to the outer surface of said shell.

9. A reinforced plastic tubular body comprising a plurality of stave-like segmental strips disposed in edge-to-edge abutment to form a tubular shell, said strips being formed substantially entirely of continuous resin bonded filaments extending longitudinally from one end thereof to the other, and means for retaining said strips in assembled relation comprising circumferentially wound resin bonded filament means overlaying and bonded to at least the outer surface of said shell.

10. A reinforced plastic tubular body comprising a plurality of stave-like segmental strips disposed in edge-to-edge abutment to form a tubular shell, said strips being formed substantially entirely of continuous resin bonded filaments extending longitudinally from one end thereof to the other, and means for retaining said strips in assembled relation comprising circumferentially wound filament means overlaying a surface of said shell.

References Cited in the file of this patent

UNITED STATES PATENTS

| | | |
|---|---|---|
| 1,988,838 | Eden | Jan. 22, 1935 |
| 2,407,711 | Luth | Sept. 17, 1946 |
| 2,645,591 | Makrauer | July 14, 1953 |
| 2,685,979 | Zeek et al. | Aug. 10, 1954 |
| 2,744,043 | Ramberg | May 1, 1956 |
| 2,848,133 | Ramberg | Aug. 19, 1958 |
| 2,939,603 | Young | June 7, 1960 |
| 2,991,210 | Matkovich | July 4, 1961 |